US010247972B2

(12) United States Patent
Meyers et al.

(10) Patent No.: US 10,247,972 B2
(45) Date of Patent: Apr. 2, 2019

(54) ULTRA-THIN DISPLAY ASSEMBLY WITH INTEGRATED TOUCH FUNCTIONALITY

(71) Applicants: David Michael Meyers, Round Rock, TX (US); Deeder Mohammad Aurongzeb, Round Rock, TX (US)

(72) Inventors: David Michael Meyers, Round Rock, TX (US); Deeder Mohammad Aurongzeb, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 152 days.

(21) Appl. No.: 13/921,900

(22) Filed: Jun. 19, 2013

(65) Prior Publication Data

US 2014/0375938 A1    Dec. 25, 2014

(51) Int. Cl.
*G06F 1/16*      (2006.01)
*G06F 3/041*     (2006.01)
*G02F 1/1333*    (2006.01)

(52) U.S. Cl.
CPC ...... *G02F 1/133308* (2013.01); *G06F 1/1613* (2013.01); *G06F 1/1643* (2013.01); *G06F 3/041* (2013.01); *G02F 1/13338* (2013.01); *G02F 2001/133314* (2013.01); *G02F 2202/28* (2013.01); *G06F 2203/04103* (2013.01)

(58) Field of Classification Search
IPC ........................ G02F 2202/28,1/1333, 2201/50, 2001/133331, 2001/133334
See application file for complete search history.

(56) References Cited

U.S. PATENT DOCUMENTS

| 7,808,776 | B2  |    | 10/2010 | Bauer et al. |
|---|---|---|---|---|
| 2002/0154254 | A1 | * | 10/2002 | Tasaki ............... G02F 1/133308 349/58 |
| 2008/0042997 | A1 | * | 2/2008 | Endo ............................ 345/176 |
| 2009/0066873 | A1 |   | 3/2009 | Liao et al. |
| 2009/0237602 | A1 | * | 9/2009 | Kubota et al. ................. 349/122 |
| 2009/0290090 | A1 | * | 11/2009 | Byoun et al. .................... 349/58 |
| 2011/0012852 | A1 | * | 1/2011 | Takahashi ........... G02F 1/13338 345/173 |
| 2011/0080695 | A1 | * | 4/2011 | Cho .................. G02F 1/133308 361/679.01 |
| 2012/0006585 | A1 | * | 1/2012 | Chikahisa ............... G06F 3/045 174/257 |
| 2014/0078696 | A1 | * | 3/2014 | Matsuda et al. .............. 361/752 |

FOREIGN PATENT DOCUMENTS

WO    WO 2011/141742    11/2011    ............... G06F 1/16

* cited by examiner

*Primary Examiner* — Lauren Nguyen
(74) *Attorney, Agent, or Firm* — Baker Botts L.L.P.

(57) ABSTRACT

Methods for manufacturing an ultra-thin display assembly with integrated touch functionality may include edge bonding a laminate layer to a backlight portion of an LCD module. A display portion of the LCD module may be direct bonded to a cover glass including a transparent conductive electrode layer. The cover glass may be manufactured from a large glass sheet and may have an edge polymer deposited on edges of the cover glass, a conductive polymer layer over the transparent conductive electrode layer, and a smart polymer at the edges of the cover glass.

6 Claims, 5 Drawing Sheets

ULTRA-THIN DISPLAY ASSEMBLY WITH INTEGRATED TOUCH FUNCTIONALITY

BACKGROUND

Field of the Disclosure

This disclosure relates generally to portable information handling systems and, more particularly, to ultra-thin display assemblies with integrated touch functionality for portable information handling systems.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Liquid crystal displays ("LCDs") are commonly employed for portable information handling systems configured in the form of laptop, notebook, netbook, and tablet computers, among others. Another type of display technology used in portable information handling systems is an organic light emitting diode ("OLED"), in which individual pixels, generated by individual electrochemical cells formed from a layer of organic materials, are sandwiched between two electrode layers. Since the individual pixel cells of an OLED generate light, an OLED may be used without a backlight element. The LCD and/or OLED screen of a typical laptop computer may be mounted within a display housing that is hingeably attached to a base housing that contains the keyboard for the notebook computer. Recently various designs for portable information handling systems have been introduced that combine conventional laptop and tablet functionality and may employ various types of connections to a base housing, including various types hinges and/or removable attachment mechanisms. Furthermore, with the advent of various mobile operating systems supporting touch operation, integration of touch panels within the LCD and/or OLED display assembly of portable information handling systems has become highly relevant to satisfying market expectations.

Simultaneously, advancements in packaging design have reduced both the weight and thickness of LCD assemblies used in portable information handling systems. In particular, as the thickness of portable LCD assemblies with integrated touch functionality decreases, achieving sufficient structural integrity becomes more and more challenging. Risks of insufficient structural integrity in a thin or an ultra-thin LCD/touch assembly include excessive deflection that can lead to cracking of surface glass and/or disablement of touch functionality.

Accordingly, it is desirable to have an improved design and a correspondingly improved manufacturing method for ultra-thin LCD/touch assemblies for portable information handling systems that provide sufficient structural integrity for reliable operation and use.

SUMMARY

In one aspect, a disclosed method of manufacturing a display assembly for a portable information handling system may include edge bonding a laminate cover to a rear surface of a liquid crystal display (LCD) module. The laminate cover may be fiber-strengthened. The laminate cover may form an external surface of the portable information handling system. The method may include direct bonding a front surface of the LCD module to a cover glass using an optically clear adhesive having a thickness E to form the display assembly. The cover glass may include a transparent conductive electrode layer.

In another aspect, a disclosed method of manufacturing a cover glass for the display assembly may include machining a cover glass portion to form a cover glass. The cover glass portion may be cut from a glass sheet. The method may include performing a chemical edge polish to chemically smooth edges of the cover glass, depositing an edge polymer to edge surfaces of the cover glass, and bonding a transparent conductive layer supporting touch functionality to the cover glass. In various embodiments, the method may include depositing a conductive polymer layer over the transparent conductive layer at the edges of the cover glass, and applying a smart polymer layer at the edges of the cover glass, wherein the smart polymer hardens under mechanical loading.

Other disclosed aspects include the display assembly and a portable information handling system including the display assembly.

BRIEF DESCRIPTION OF THE DRAWINGS

For a more complete understanding of the present invention and its features and advantages, reference is now made to the following description, taken in conjunction with the accompanying drawings, in which.

DESCRIPTION OF PARTICULAR EMBODIMENT(S)

Figure 1:
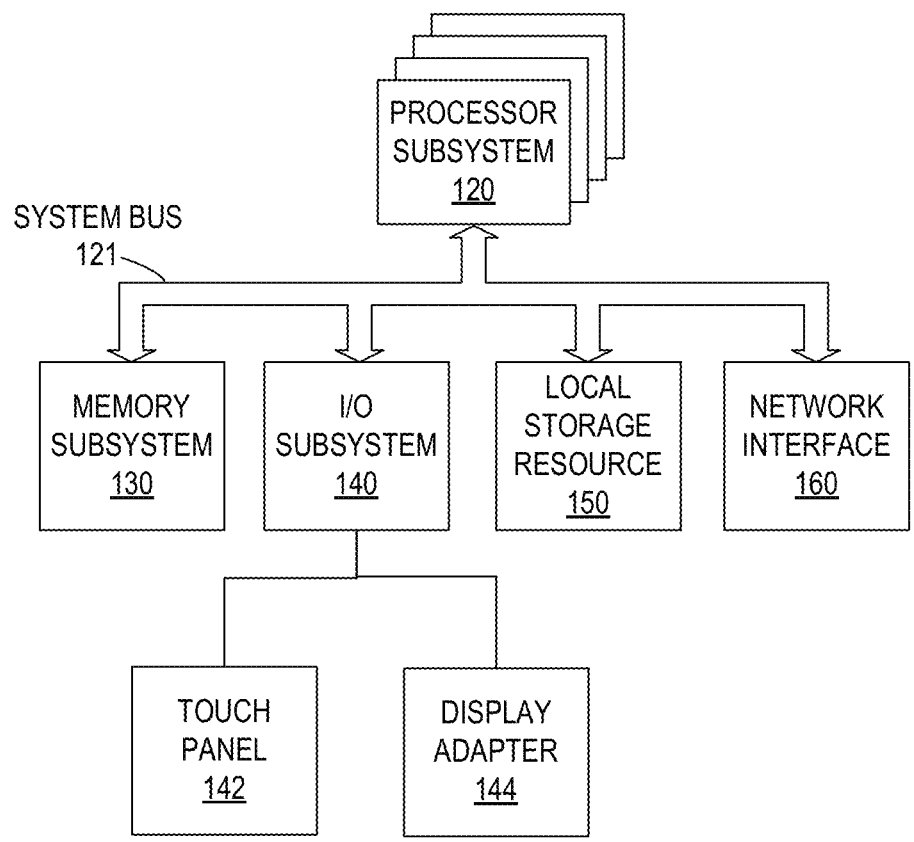
FIG. 1 is a block diagram of selected elements of an embodiment of a portable information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

As noted previously, current portable information handling systems may demand ever thinner solutions for LCD/touch assemblies (referred to herein as simply as a "display assembly"). However, as thickness of display assemblies becomes smaller, structural integrity becomes an ever more important issue. As will be described in further detail, the inventors of the present disclosure have developed novel methods and structures disclosed herein for manufacturing ultra-thin display assemblies for use in portable information handling systems. Although the present disclosure will be described using an LCD assembly, it is noted that an OLED display assembly may be used in various embodiments (not shown).

Particular embodiments are best understood by reference to FIGS. 1, 2A, 2B, 3, and 4 wherein like numbers are used to indicate like and corresponding parts.

Turning now to the drawings, FIG. 1 illustrates a block diagram depicting selected elements of an embodiment of portable information handling system 100. As shown in FIG. 1, components of portable information handling system 100 may include, but are not limited to, processor subsystem 120, which may comprise one or more processors, and system bus 121 that communicatively couples various system components to processor subsystem 120 including, for example, a memory subsystem 130, an I/O subsystem 140, local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

In FIG. 1, network interface 160 may be a suitable system, apparatus, or device operable to serve as an interface between information handling system 100 and a network 155. Network interface 160 may enable information handling system 100 to communicate over network 155 using a suitable transmission protocol and/or standard, including, but not limited to, transmission protocols and/or standards enumerated below with respect to the discussion of network 155. In some embodiments, network interface 160 may be communicatively coupled via network 155 to network storage resource 170. Network 155 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network 155 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 155 and its various components may be implemented using hardware, software, or any combination thereof.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of physical hardware 102). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down. Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, network storage resource 170 may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data. In system 100, I/O subsystem 140 may comprise a system, device, or apparatus generally operable to receive and/or transmit data to/from/within system 100. I/O subsystem 140 may represent, for example, a variety of communication interfaces, graphics interfaces, video interfaces, user input interfaces, and/or peripheral interfaces. As shown, I/O subsystem 140 may comprise touch panel 142 and display adapter 144. Touch panel 142 may include circuitry for enabling touch functionality in conjunction with a display for (not shown) that is driven by display adapter 144.

Figure 2A:
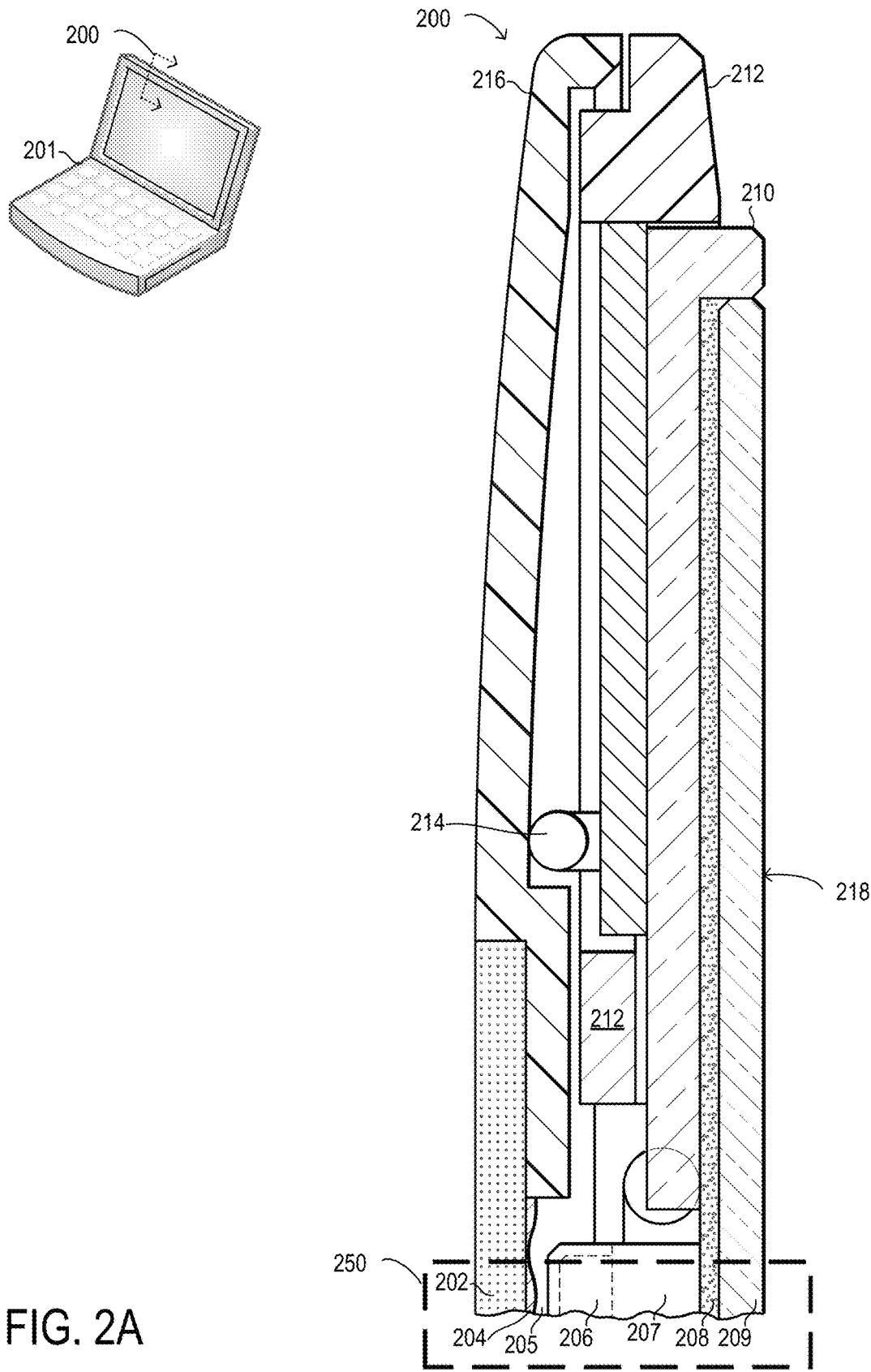
FIGS. 2A and 2B are block diagrams of selected elements of an embodiment of an ultra-thin display including touch functionality.

Turning now to FIG. 2A, a block diagram of selected elements of an embodiment of display 200 is illustrated. In FIG. 2A, display 200 is shown as a sectional view of an upper portion of a display included with portable information handling system 201, which may be any of various types of portable information handling systems, as disclosed herein. As shown in FIG. 2A, display 200 includes plastic frame 210, structural element 212, back cover 216, wire connector 214 and display assembly 250 (see also FIG. 2B). Plastic frame 210 may represent a bezel or similar structure for framing display 200, while structural element 212 may be a supporting member of display 200 that is comprised of a metal or metal allow, such as aluminum or an aluminum alloy. Back cover 216 may represent an external portion of information handling system 201, while wire connector 214 may provide stability for internal circuitry and corresponding connectors.

Also shown in FIG. 2A is display assembly 250, which will now be described in further detail (see also FIG. 2B). As shown display assembly 250 may represent a bonded structure of different elements that provides display and touch functionality within information handling system 201. In particular embodiments, display assembly 250 may be an ultra-thin structure with high structural integrity and low deflection, as will be described herein. Display assembly 250 may include laminate cover 202, foil layer 204, tolerance gap 205, LCD module comprising backlight portion 206 and display portion 207, optically clear adhesive 208, cover glass 209.

In FIG. 2A, laminate cover 202 may be formed using a multi-layered structure that has been fiber-strengthened. For example, when information handling system 201 is a laptop- or notebook-type of system, laminate cover 202 may be formed using carbon fiber laminate for strength and desirable exterior finish. In another non-limiting example, when information handling system 201 is a tablet-type of system, laminate cover 201 may be formed using aramid fiber and/or glass fiber laminate. In various embodiments, laminate cover 201 may be comprised of about 3 laminate layers. Foil layer 204 may be bonded to laminate cover 202 and may provide shielding against electromagnetic interference (EMI). In various embodiments, foil layer 204 may be a metallic layer that may be sprayed-on and/or deposited using a vacuum chamber process. Tolerance gap 205 may represent a gap between backlight portion 206 and laminate cover 202, which may be edge bonded together. As used herein, "edge bonding" shall refer to a bonding process using adhesive at the edges of two members being bonded together, while "direct bonding" shall refer to a solid bond using an adhesive layer over surfaces of the two members being bonded together. An LCD module is shown as two portions, namely backlight portion 206 and display portion 207. In some embodiments, the LCD module may be introduced into display assembly 250 after backlight portion 206 and display portion 207 are edge bonded together. In other embodiments, backlight portion 206 may first be edge bonded to laminate cover 202 and then edge bonded to display portion 207 (see also FIG. 3). Display portion 207 is oriented for viewing facing cover glass 209, and these two elements may be direct bonded together using optically clear adhesive 208. As shown, cover glass 209 may include (or may be formed with, see FIG. 4) transparent conductive electrode layer 218 bonded thereon to support touch functionality. In one embodiment, transparent conductive electrode layer 218 is a patterned layer of indium tin oxide (ITO) having an amorphous structure. Transparent conductive electrode layer 218 may be about 500 nm to 1000 nm thick, and/or may be as thick as transparency of the material selected for the layer permits for a given application. In different embodiments, other conductive oxide layers may be used for transparent conductive electrode layer 218, such as, but not limited to, indium gallium tin oxide and indium zinc oxide, and may exhibit amorphous or crystalline structures.

As shown, display 200 may be very thin (i.e., between about 4.5 mm and 5.0 mm) in aggregate while exhibiting excellent structural integrity due to the novel structure of display assembly 250, as described herein. Specifically, display assembly 250 may have a stiffness (or rigidity) such that when loaded with a force of 98 N (i.e., 22 lbs.) at a center of display assembly 250, a deflection of the display assembly may be less than about 1% of a maximum span of the display assembly. The maximum span refers to a maximum of the width and the height of the display assembly. For example, when display assembly is 200 mm×300 mm, a deflection from a 22 lb. load at a center of display 200 may be less than about 3 mm.

Figure 2B:
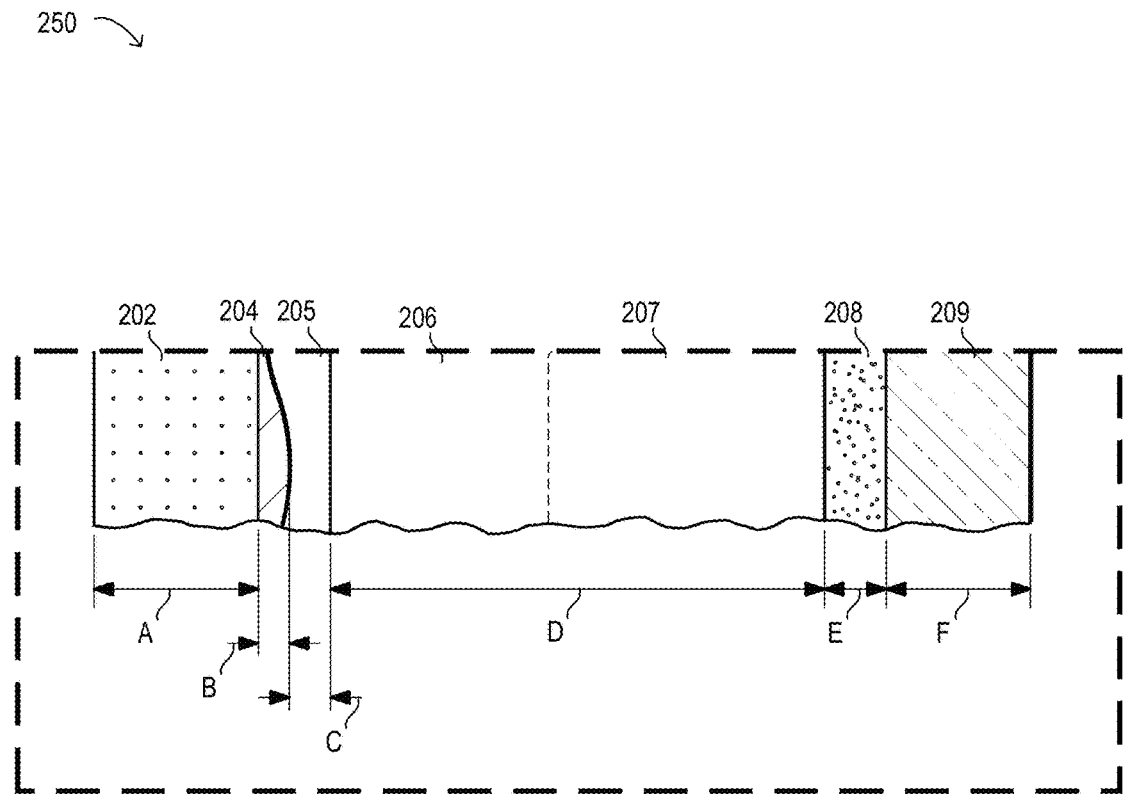

Turning now to FIG. 2B, a block diagram of selected elements of an embodiment of display assembly 250 is illustrated, representing the corresponding structure in FIG. 2A. In FIG. 2B, dimensional values are indicated for the elements included in display assembly. Laminate cover 202 may have a thickness A, where A is nominally about 0.8 mm, but may be in the range of about 0.4 mm to about 1.0 mm in different embodiments. Foil layer 204 may have a thickness B, where B is nominally about 0.15 mm. Tolerance gap 205 may have a thickness C, where C is nominally about 0.2 mm. LCD module, comprising backlight portion 206 and display portion 207, may have an aggregate thickness D, where D is nominally about 2.4 mm, and may be as small as 2.0 mm in given embodiments. Optically clear adhesive 208 may have a thickness E, where E is nominally about 0.3 mm. Finally, cover glass 209 may have an aggregate thickness (including transparent conductive electrode layer 218 for supporting touch functionality, not shown in FIG. 2B, see FIG. 2A) F, where F is nominally about 0.7 mm, and may be as small as 0.3 mm in given embodiments. A total thickness P of display assembly 250 (and/or of display 200) may be given by a sum of A, B, C, D, E, and F. According to the thickness values A-F described above, certain dimensional characteristics of display assembly 250 may be expressed as ratios and/or ranges of ratios. Specifically, a ratio of P/A may be selected in a range of about 10.4 to 4.4. A ratio of P/D may be selected in the range of about 2.2 to 1.7. A ratio of P/F may be selected in the range of about 14.5 and 5.9.

Figure 3:
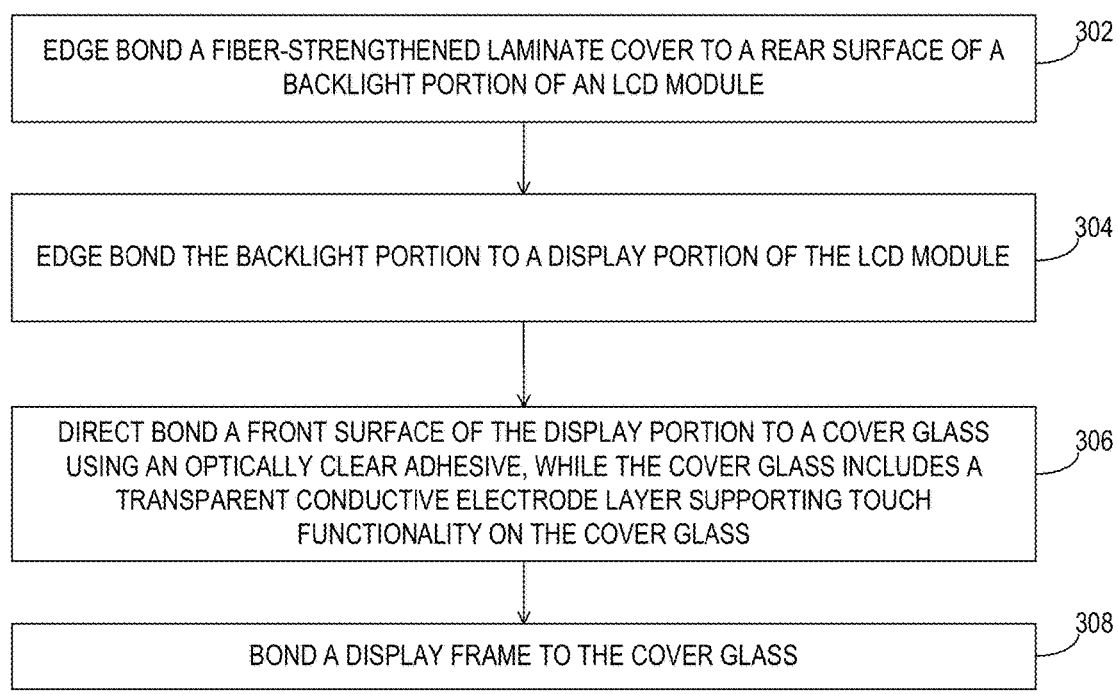
FIG. 3 is flowchart depicting selected elements of an embodiment of a method for manufacturing an ultra-thin display assembly including touch functionality.

Referring now to FIG. 3, a block diagram of selected elements of an embodiment of method 300 for manufacturing an ultra-thin display assembly is depicted in flowchart form. It is noted that certain operations described in method 300 may be optional or may be rearranged in different embodiments.

In FIG. 3, method 300 may begin by edge bonding (operation 302) a fiber-strengthened laminate cover to a rear surface of a backlight portion of an LCD module. The rear surface of the backlight portion represents a surface opposing a display portion of the LCD module. The backlight portion may be edge bonded (operation 304) to a display portion of the LCD module. The backlight portion may be edge bonded at a front surface to the display portion. It is noted that, in certain embodiments, operation 304 may be omitted, for example, when the LCD module is used in method 300 after the backlight portion and the display portion have already been edge bonded together. Then, a front surface of the display portion may be direct bonded (operation 306) to a cover glass using an optically clear adhesive, while the cover glass includes a transparent conductive electrode layer supporting touch functionality on the cover glass. Finally, a display frame may be bonded (operation 308) to the cover glass. It is noted that the bonding in operation 308 may be performed on a rear surface of cover glass at a portion of cover glass that extends beyond a maximum span of the LCD module.

Figure 4:
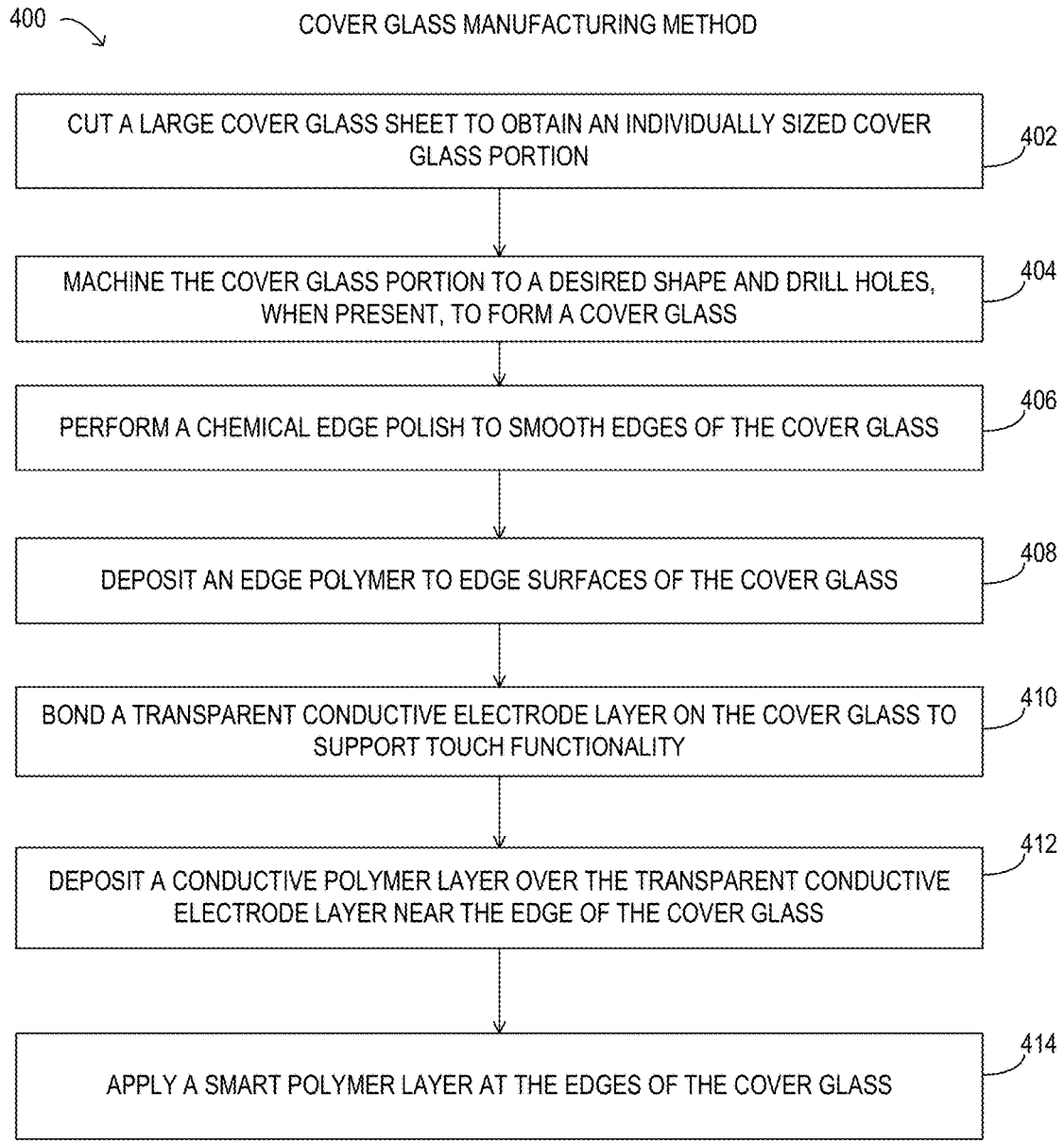
FIG. 4 is flowchart depicting selected elements of an embodiment of a method for manufacturing a cover glass for use in an ultra-thin display assembly including touch functionality.

Referring now to FIG. 4, a block diagram of selected elements of an embodiment of method 400 for manufacturing a cover glass for using with the ultra-thin display assembly described herein is depicted in flowchart form. It is noted that certain operations described in method 400 may be optional or may be rearranged in different embodiments.

In method 400, a large glass sheet may be cut (operation 402) to obtain an individually sized cover glass portion. The cover glass portion may be machined (operation 404) to a desired shape and holes may be drilled (operation 404), when present, to form a cover glass. Then, a chemical edge polish may be performed (operation 406) to smooth edges of the cover glass. An edge polymer may be deposited (operation 408) to edge surfaces of the cover glass. The edge polymer may be a microcrack-filling resin that stabilizes cracks in the cover glass. A transparent conductive electrode layer may be bonded (operation 410) on the cover glass to support touch functionality. In certain embodiments, operation 410 may involve a deposition process. The transparent conductive electrode layer may comprise indium tin oxide (ITO) and/or a similar transparent conductor. A conductive polymer layer may be deposited (operation 412) over the transparent conductive electrode layer near the edge of the cover glass. The conductive polymer layer may be deposited in operation 412 over edges of the transparent conductive electrode layer. Finally, a smart polymer layer may be applied (operation 414) at the edges of the cover glass. Application of the smart polymer may involve dip coating or brushing on (i.e., painting) processes.

As disclosed herein, methods for manufacturing an ultra-thin display assembly with integrated touch functionality may include edge bonding a laminate layer to a backlight portion of an LCD module. A display portion of the LCD module may be direct bonded to a cover glass including a transparent conductive electrode layer. The cover glass may be manufactured from a large glass sheet and may have an edge polymer deposited on edges of the cover glass, a conductive polymer layer over the transparent conductive electrode layer, and a smart polymer at the edges of the cover glass.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A display assembly for a portable information handling system, comprising:
   a laminate cover having a thickness A that is fiber-strengthened using a carbon fiber laminate and forms an external surface of the portable information handling system;
   a liquid crystal display (LCD) module having a thickness D edge bonded to the laminate cover using an adhesive applied only to edge surfaces of the LCD module such that a tolerance gap remains between a rear surface of the LCD module and the laminate cover, the LCD module including a backlight portion and a display portion, wherein the laminate cover encloses the rear surface of the LCD module opposite a display surface of the LCD module; and
   a cover glass having a thickness F direct bonded to the LCD module using an optically clear adhesive having a thickness E such that the display surface of the LCD module is bonded to the cover glass, the cover glass including a transparent conductive electrode layer,
   wherein the display assembly has a total thickness P, including the thickness A of the laminate cover, the thickness D of the LCD module, the thickness E of the optically clear adhesive, and the thickness F of the cover glass, and wherein the display assembly has a stiffness corresponding to a deflection of the display assembly of less than 1% of a maximum span of the display assembly under a load of 98 N force at a center of the display assembly.

2. The display assembly of claim 1, wherein a ratio of P/A is between 10.4 and 4.4, and wherein the laminate cover is fiber-strengthened using at least one of: a carbon fiber layer; a glass fiber layer; and an aramid fiber layer.

3. The display assembly of claim 1, wherein a ratio of P/F is between 14.5 and 5.9, and wherein P is less than 4.8 mm.

4. The display assembly of claim 1, wherein the transparent conductive electrode layer comprises indium tin oxide (ITO).

5. The display assembly of claim 1, further comprising:
   a foil layer having a thickness B between the laminate cover and the LCD module; and
   a gap having a thickness C between the foil layer and the LCD module, wherein the total thickness P is 4.55 mm and wherein:
   the thickness A is 0.8 mm;
   the thickness B is 0.15 mm;
   the thickness C is 0.2 mm;
   the thickness D is 2.4 mm;
   the thickness E is 0.3 mm; and
   the thickness F is 0.7 mm.

6. The display assembly of claim 1, wherein the cover glass includes an edge polymer applied at edge surfaces of the cover glass to stabilize cracks in the cover glass, and wherein the cover glass includes a conductive polymer layer applied over the transparent conductive electrode layer.

* * * * *